(12) United States Patent
Majumder

(10) Patent No.: US 10,199,825 B2
(45) Date of Patent: Feb. 5, 2019

(54) CONTROL OF A MICROGRID

(71) Applicant: ABB Schweiz AG, Baden (CH)

(72) Inventor: Ritwik Majumder, Västerås (SE)

(73) Assignee: ABB Schweiz AG, Baden (CH)

( * ) Notice: Subject to any disclaimer, the term of this patent is extended or adjusted under 35 U.S.C. 154(b) by 190 days.

(21) Appl. No.: 15/502,716

(22) PCT Filed: Aug. 11, 2014

(86) PCT No.: PCT/EP2014/067172
§ 371 (c)(1),
(2) Date: Feb. 8, 2017

(87) PCT Pub. No.: WO2016/023574
PCT Pub. Date: Feb. 18, 2016

(65) Prior Publication Data
US 2017/0237256 A1    Aug. 17, 2017

(51) Int. Cl.
*H02J 3/06* (2006.01)
*H02J 3/40* (2006.01)
(Continued)

(52) U.S. Cl.
CPC .............. *H02J 3/06* (2013.01); *H02J 3/08* (2013.01); *H02J 3/40* (2013.01); *H02J 3/42* (2013.01)

(58) Field of Classification Search
CPC ........ H02J 3/06; H02J 3/40; H02J 3/42; H02J 3/08
See application file for complete search history.

(56) References Cited

U.S. PATENT DOCUMENTS

| 5,952,816 A | 9/1999 | Larsen |
|---|---|---|
| 2007/0129110 A1 | 6/2007 | Lasseter et al. |

(Continued)

FOREIGN PATENT DOCUMENTS

EP    2600216    6/2013

OTHER PUBLICATIONS

Meiqin Mao et al, An Intelligent Static Switch Based on Embedded System and Its Control Method for a Microgrid,2012, IEEE PES ISG1 ASIA 2012 1569539209.*

(Continued)

*Primary Examiner* — Robert Deberadinis
(74) *Attorney, Agent, or Firm* — Wyitmyer IP Group LLC

(57) ABSTRACT

A method performed in an electrical microgrid for facilitating connection of a first and second AC power networks. The method includes, when the power networks are disconnected, from the second power network, controlling the AC frequency of the first power network based on the AC frequency of the second power network for ensuring that when the first and second networks are connected power will flow from the power network of the first and second power networks having a higher frequency to the power network of the first and second power networks having a lower frequency. The method also includes, after the controlling, connecting the first power network to the second power network, whereby power, at the instant of connecting, flows from the power network of the first and second power networks having a higher frequency to the power network of the first and second power networks having a lower frequency.

18 Claims, 6 Drawing Sheets

(51) Int. Cl.
*H02J 3/08* (2006.01)
*H02J 3/42* (2006.01)

(56) References Cited

U.S. PATENT DOCUMENTS

2010/0292853 A1  11/2010  McDonnell
2011/0248569 A1  10/2011  Son et al.

OTHER PUBLICATIONS

PCT International Search Report & Written Opinion Application No. PCT/EP2014/0267172 Completed Date Apr. 10, 2015; dated Apr. 23, 2015, 13 Pages.
Meiqin, Mao et al.: "An intelligent static switch based on embedded system and its control method for a microgrid" Innovative Smart Grid Technologies—Asia; May 21, 2012 6 Pages.
PCT International Preliminary Report on Patentability Application No. PCT/EP2014/067172 Completed date: Nov. 11, 2016 17 Pages.
Lasseter, Robert H, et al: "Control and Design of Microgrid Components" Jan. 31, 2006 URL:http://www.pserc.wisc.edu/documents/publications/reports/2006_reports/lasseter_microgridcontrol_final_project_report.pdf. Retrieved: Apr. 10, 2015.
PCT Written Opinion of International Preliminary Examining Authority Application No. PCT/EP2014/067172 Completed date: Jul. 13, 2016 7 Pages.

\* cited by examiner

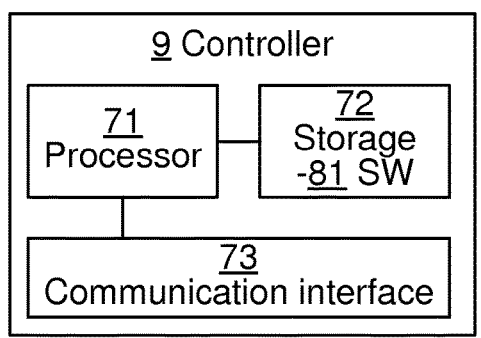
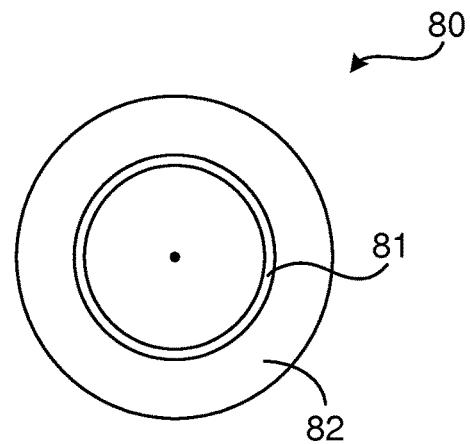
Fig. 7　　　　　　　　Fig. 8
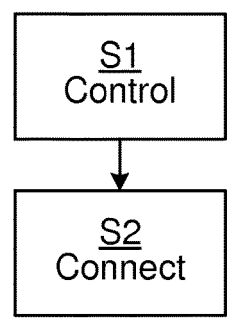
Fig. 9

CONTROL OF A MICROGRID

TECHNICAL FIELD

The present disclosure relates to a method and a device for frequency control in a microgrid for facilitating reconnection of a first and a second alternating current (AC) network with each other.

BACKGROUND

A microgrid is a localized grouping of electricity generation, energy storage, and loads that normally operates connected to a traditional centralized grid (macrogrid) via a point of common coupling (PCC). This single point of common coupling with the macrogrid can be disconnected, islanding the microgrid. Microgrids are part of a structure aiming at producing electrical power locally from many small energy sources, distributed generators (DGs). In a microgrid, a DG is connected via a converter which controls the output of the DG, i.e. the current injected into the microgrid.

A microgrid (in grid connected mode, i.e. connected to the macrogrid) supplies the optimized or maximum power outputs from the connected DG sites and the rest of the power is supplied by the macrogrid. The microgrid is connected to the macrogrid at a PCC through a controllable switch. This grid connection is lost during grid fault and the microgrid is islanded.

During islanding, there is a risk of imbalance in the microgrid due to the loss of power import from grid as well as loss of voltage control by the grid. For voltage control it is required to change control mode of the DGs. The power balancing is solved by fast storage action and immediate load shedding schemes.

In an AC microgrid, the frequency is the same everywhere in steady state while voltage may differ depending on the power flow. However, in a microgrid with a continuous change in DG output, load switching and low inertia, there is continuous frequency and voltage fluctuation to a small scale. And the deviations are larger during large transients (like DG fault etc.).

Frequency and voltage stability relates to minimum oscillations and overshoot with ability to come back to initial value (or any other steady state value within acceptable deviation) after a disturbance.

A microgrid with multiple DGs and loads requires several switches at different level to connect and disconnect different network parts within the microgrid as well as to the main power grid. While the automatic disconnections by these switches are aimed for system protection, planned connection and disconnections are required for optimized operation ensuring power balance and resynchronization maintaining acceptable system dynamics in voltage, frequency and power oscillations. Before reconnection of a network to the microgrid resynchronization with voltage magnitude, phase angle and frequency matching is performed to ensure stability of the microgrid at reconnection.

US 2007/129110 discloses the use of an interface switch to re-join an islanded part of an electrical power network with the rest of the network. An interface switch is closed when the voltage difference between E and V and the relative phase angle deltaEV between E (external voltage) and V (internal voltage) are both small, and when the higher frequency voltage (as between E and V) leads the lower frequency voltage. Thus, the document teaches to observe the voltages and phase angles to choose a good time for reconnecting the islanded network.

SUMMARY

It is an objective of the present invention to provide an improved method of controlling a microgrid to facilitate reconnection of a first and a second electrical power network to each other.

According to an aspect of the present invention, there is provided a method performed in an electrical microgrid for facilitating connection of a first alternating current (AC) power network to a second AC power network. The method comprises, when the first power network is disconnected from the second power network, controlling the AC frequency of the first power network based on the AC frequency of the second power network for ensuring that when the first and second networks are connected power will flow from the power network of the first and second power networks having a higher frequency to the power network of the first and second power networks having a lower frequency. The method also comprises, after the controlling, connecting the first power network to the second power network, whereby power, at the instant of connecting, flows from the power network of the first and second power networks having a higher frequency to the power network of the first and second power networks having a lower frequency.

According to another aspect of the present invention, there is provided a controller for an electrical microgrid, for facilitating connection of a first AC power network to a second AC power network. The controller comprises processor circuitry, and a storage unit storing instructions executable by said processor circuitry whereby said controller is operative to, when the first power network is disconnected from the second power network, control the AC frequency of the first power network based on the AC frequency of the second power network for ensuring that power will flow from the power network of the first and second power networks having a higher frequency to the power network of the first and second power networks having a lower frequency. The controller is also operative to, after the controlling, connect the first power network to the second power network, whereby power, at the instant of connecting, flows from the power network of the first and second power networks having a higher frequency to the power network of the first and second power networks having a lower frequency.

According to another aspect of the present invention, there is provided a microgrid comprising an embodiment of the controller of the present disclosure.

According to another aspect of the present invention, there is provided a computer program product comprising computer-executable components for causing a microgrid controller to perform an embodiment of the method of the present disclosure when the computer-executable components are run on processor circuitry comprised in the controller.

According to another aspect of the present invention, there is provided a computer program comprising computer program code which is able to, when run on processor circuitry of a microgrid controller, cause the controller to, when a first power network is disconnected from a second power network, control the AC frequency of the first power network based on the AC frequency of the second power network for ensuring that power will flow from the power network of the first and second power networks having a higher frequency to the power network of the first and second power networks having a lower frequency. The code is also able to cause the controller to, after the controlling, connect the first power network to the second power network, whereby power, at the instant of connecting, flows from the power network of the first and second power networks having a higher frequency to the power network of the first and second power networks having a lower frequency.

According to another aspect of the present invention, there is provided a computer program product comprising an embodiment of the computer program of the present disclosure and a computer readable means on which the computer program is stored.

By controlling the frequency of the first network before connecting it to the second network, it is in accordance with the present invention possible to make sure that the power, at the instant of connection, flows in the desired direction between the two networks, e.g. in the same direction as during steady-state conditions. Otherwise, there is a risk that the power will, for a transient time, flow in the wrong direction.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which:

FIG. 7 is a schematic block diagram of an embodiment of a controller of the present invention.

FIG. 8 is a schematic illustration of an embodiment of a computer program product of the present invention.

FIG. 9 is a schematic flow chart of an embodiment of a method of the present invention.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
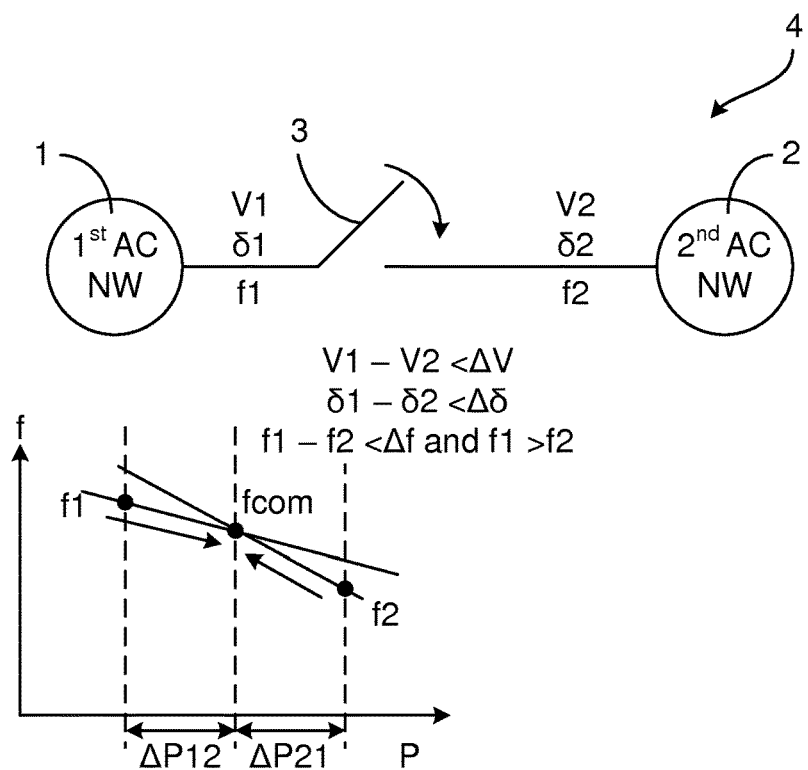
FIG. 1 is a schematic diagram of an embodiment of a microgrid comprising two AC networks, in accordance with the present invention.

The present invention is herein exemplified with methods for operating and controlling static switches for connecting different segments/networks within a microgrid. FIG. 1 illustrates a microgrid 4 where a first AC network (NW) 1 is connectable with a second AC NW 2 by means of a switch 3. The switch 3 may be a main static switch for connecting the microgrid 4 to the main power grid, an area Electric Power System (EPS) static switch to connect microgrid segments within the microgrid, or a static switch to connect a DG with local loads. Each such switch 3 may be coordinated with frequency based control in accordance with the present invention. As illustrated in FIG. 1, the first AC NW 1 has a first voltage V1, a first phase angle $\delta1$ and a first frequency f1, and the second AC NW 2 has a second voltage V2, a second phase angle $\delta2$ and a second frequency f2. Before closing the switch 3, the difference in voltage between the first and second voltages V1-V2 should be below a predetermined threshold $\Delta V$, the difference in phase angle between the first and second phase angles $\delta1-\delta2$ should be below a predetermined threshold $\Delta\delta$, and the difference in frequency between the first and second frequencies f1-f2 should be below a predetermined threshold $\Delta f$. In addition, in accordance with the present invention, the frequency of at least one of the first and second NW 1 and 2 is controlled such that it is either above or below the frequency of the other one of the first and second NW 1 and 2 to ensure that the power flows in the desired direction between the two NW 1 and 2 when they are connected, i.e. when the switch 3 is closed. In the example of FIG. 1, the first NW frequency f1 is controlled to be larger than the second NW frequency f2. The operation of the switch 3 for closing is based on that at the instant of connection, power should flow from the higher frequency first network 1 to the lower frequency network 2. This ensures that the system moves towards the steady state point with natural power system stability through the power frequency drop, as schematically illustrated in the power (P) frequency (f) graph in FIG. 1.

Figure 2:
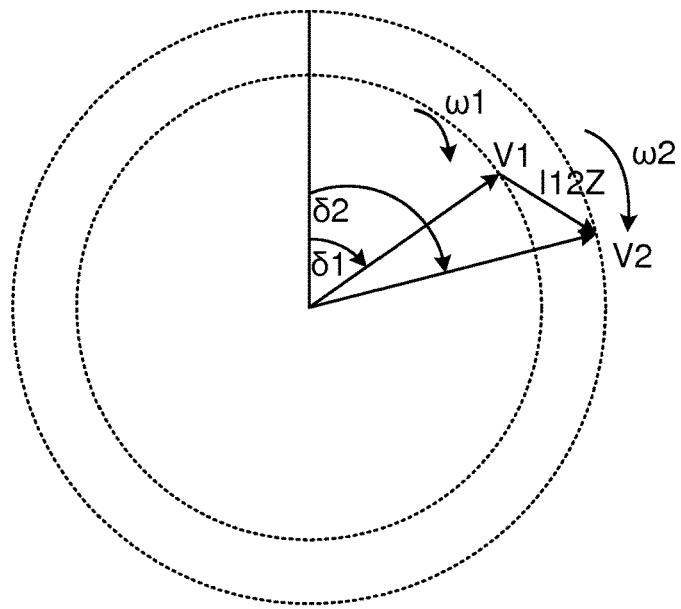
FIG. 2 is a schematic illustration of rotating voltage phasors at different frequencies, in accordance with the present invention.

In steady state, power will flow from the network having a higher frequency before connection (closing the switch 3) to the network having a lower frequency before connection, but the at instant of connection (immediately when the switch 3 is closed) the current flow direction is decided by the respective positions of the voltage vectors on either side of the switch 3, rotating at different frequencies, as illustrated in FIG. 2. FIG. 2 shows examples of voltage vectors of the first and second NW 1 and 2, where the voltage vector of the first NW 1 has a first phase angle $\delta1$, a first voltage magnitude V1 and a first angle velocity (proportional to the first frequency f1) $\omega1$, and the voltage vector of the second NW 2 has a second phase angle $\delta1$, a second voltage magnitude V2 and a second angle velocity (proportional to the second frequency f2) $\omega2$. Thus, to ensure that the power flows in the desired direction, the respective voltage vectors of the voltages V1 and V2 are observed and the switch 3 is closed at a suitable time for ensuring instantaneous power flow in the desired direction to or from the first NW 1 from or to the second NW 2.

In accordance with the present invention, the frequency of at least one of the first and second NW 1 and 2 is controlled based on the frequency of the other of the first and second NW 1 and 2. In addition to ensuring that the power flow will be in the desired direction after connection, the frequency control may also be used to ensure minimum frequency difference, f1–f2, as well as easier phase difference detection for when to close the switch 3. The frequency control may be used in addition to conventional voltage and phase angle matching in either side of the switch 3 before closing the switch 3 to connect the first and second NW 1 and 2. Thus, instantaneous power flow at instant of connection may take place in the same direction as decided by the steady state power frequency drop.

Figure 3:
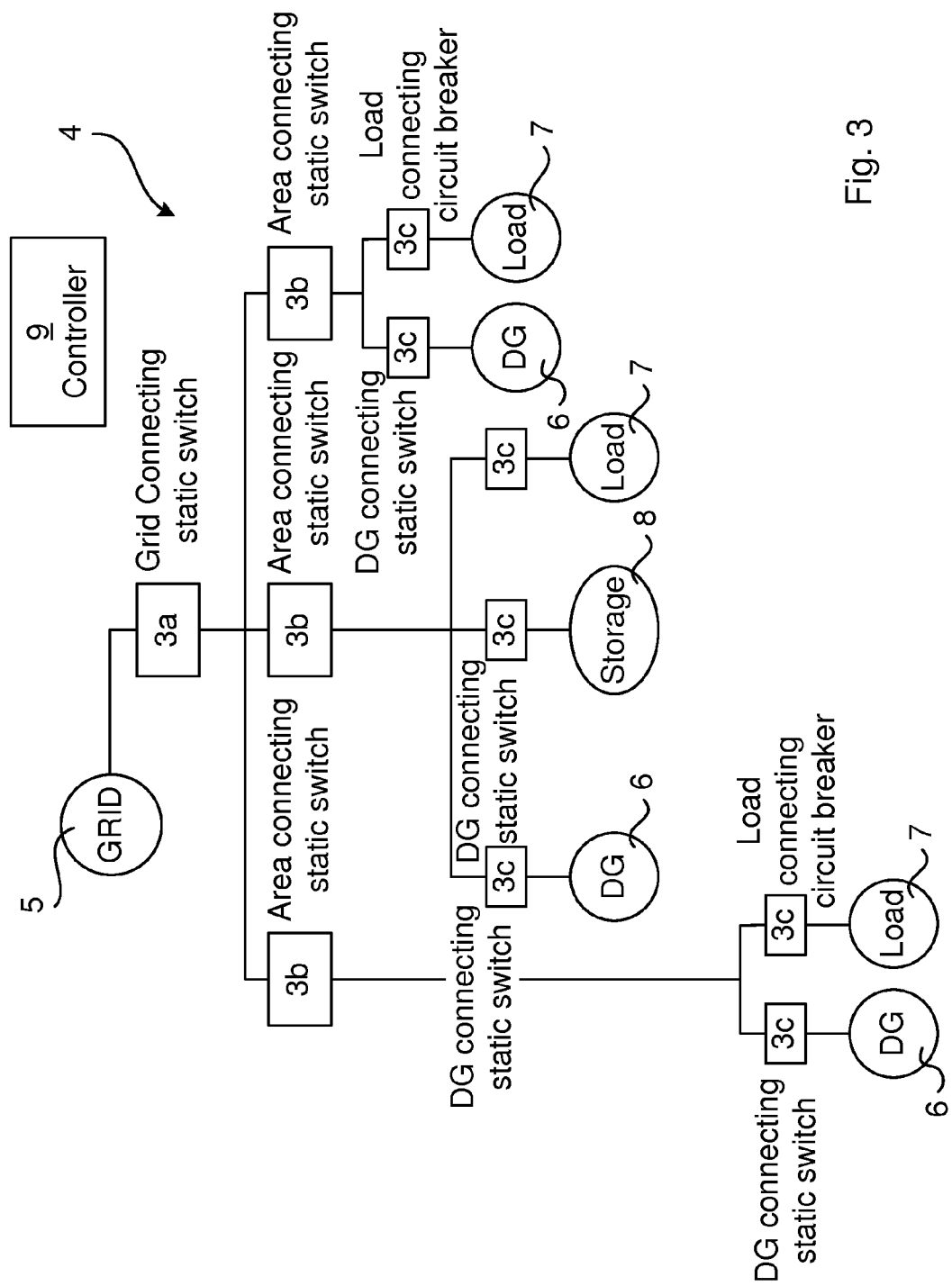
FIG. 3 is a schematic block diagram of another embodiment of a microgrid, showing different switches within the microgrid architecture, in accordance with the present invention.

FIG. 3 is a schematic illustration of an embodiment of a microgrid 4 with different switches 3 in different levels of the microgrid. This example microgrid 4 comprises a plurality of DGs 6, loads 8 and energy storages 7. A DG 6 may e.g. be associated with a local load 7 and/or energy storage 8. The microgrid 4 is connected to a main power grid 5, e.g. a macrogrid such as a national power distribution grid, via a grid connecting switch 3a at a point of common coupling (PCC). The grid connecting switch 3a may e.g. protect the microgrid 4 from short circuiting and the connection to the main power grid 5 ensures voltage and frequency control of the microgrid 4 by the power grid 5. The grid connecting switch 3a is an example of a switch 3 which may separate the first and second NW 1 and 2 of the present invention, whereby the microgrid may be resynchronised to the power grid 5 after islanding. In other embodiments of the present invention, the first and second NW 1 and 2 are different segments within the microgrid 4. In this case, the different segments i.e. the first and second NW 1 and 2 are separated/connected by an area connecting switch 3b. Each segment may e.g. comprise a DG 6 and its associated load(s) 7 and/or energy storage 8. The area connecting switch 3b may provide short circuit protection for the area EPS and the voltage and frequency may be controlled over the EPS connection. The present inventive method may be used to resynchronise the segment with another segment or with the remainder of the microgrid 4. In yet other embodiments of the present invention, the switch 3 separating/connecting the first and second NW 1 and 2 is a switch 3c connecting a component such as a DG 6, load 7 or energy storage 8 to the microgrid 4, herein called a DG connecting switch 3c. Thus, the present invention may be used to connect a DG 6 (in the first NW 1) with its associated local load 7 (in the second NW 2). A controller 9 controls the switches 3 at the different levels of the microgrid 4. The controller 9 may be regarded as a control system e.g. comprising central parts as well as distributed parts (e.g. primary controls) at the different switches. The DG connecting switch 3c may similarly provide short circuit protection of the DG 6 or storage 8 and the voltage and frequency of the DG may be controlled over the DG connecting switch 3c. The present inventive method may be used to resynchronise the component e.g. DG 6 with another component e.g. load 7 or with the remainder of the microgrid 4.

Figure 4:
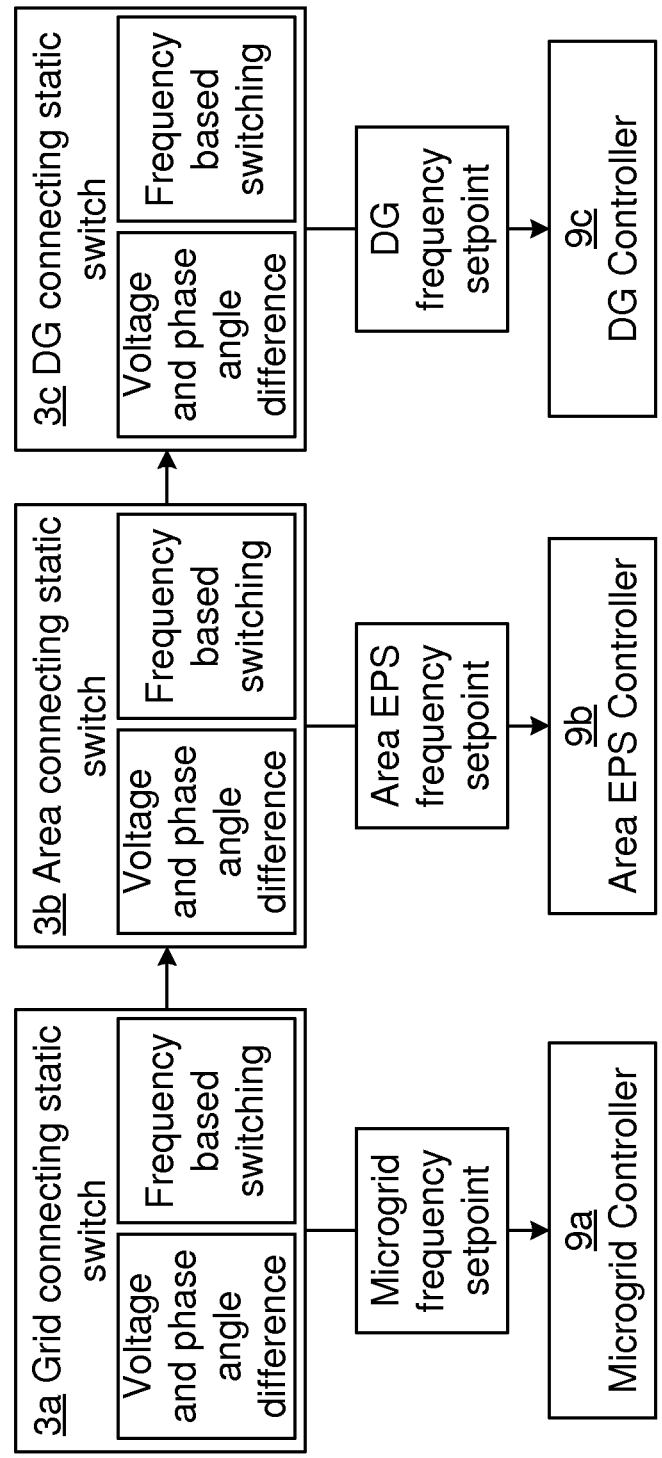
FIG. 4 is a schematic block diagram of an embodiment of switch control in a microgrid, in accordance with the present invention.

FIG. 4 illustrates an embodiment of high level schematic for the static switch control of the controller 9. In each layer, the voltage and phase angle difference is monitored and frequency based switching is done. The frequency set points for each successive network 1 and 2 is communicated to the network controller 9 (e.g. microgrid controller 9a, area EPS controller 9b, DG controller 9c etc.). Thus, embodiments of the inventive method may be used on different levels, and may be used cascading, to reconnect the whole microgrid 4. The frequency set point at each NW 1 or 2 is modified to ensure power flow from higher to lower frequency network at time of connection.

Figure 5:
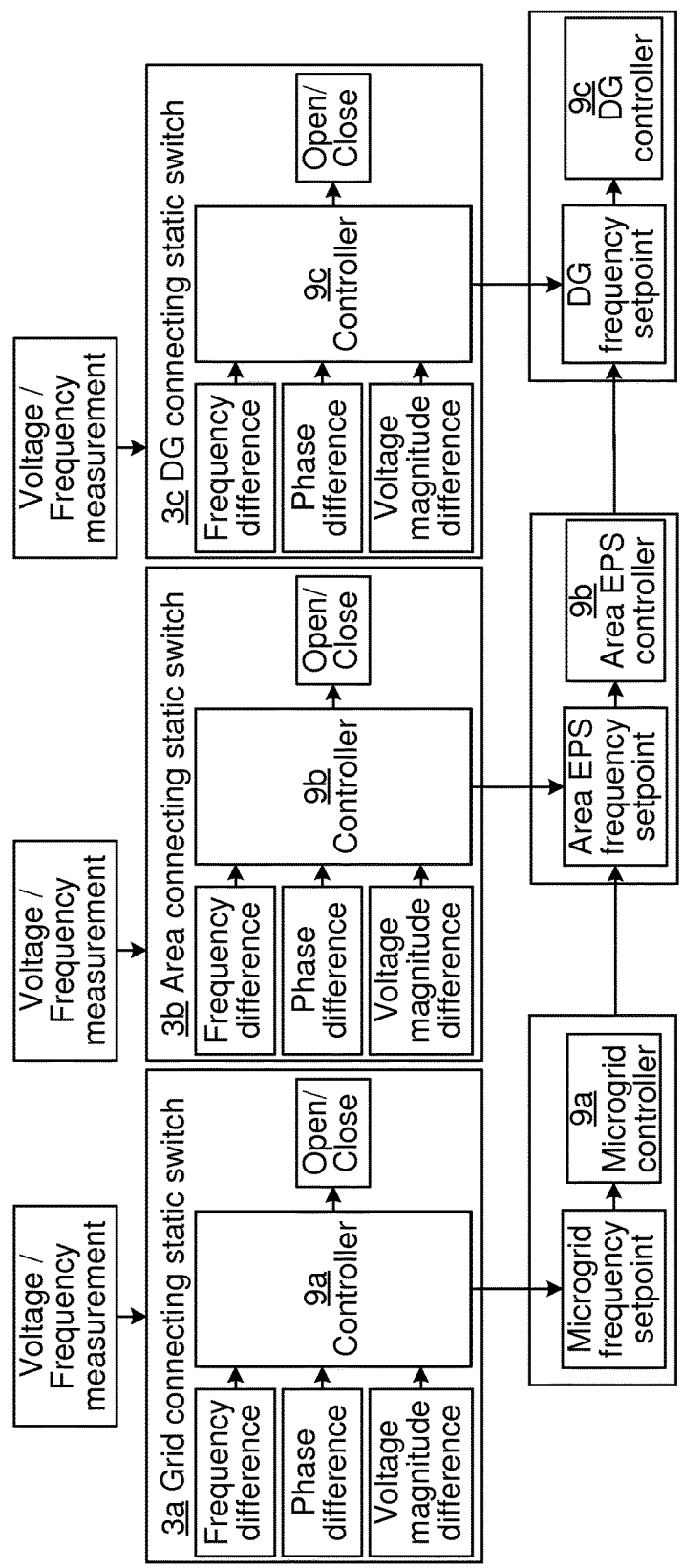
FIG. 5 is a schematic block diagram of another, more detailed, embodiment of the control in a microgrid, in accordance with the present invention.

FIG. 5 illustrates an embodiment of a controller 9 topology at each static switch 3 in the microgrid 4. The voltage and frequency measurements are used to calculate the difference in voltage, phase angle and frequency. Frequency set points are modified if required (to satisfy the condition that the frequency of one network should be higher than of the other network, as discussed herein) and the switch closing action is activated.

Figure 6:
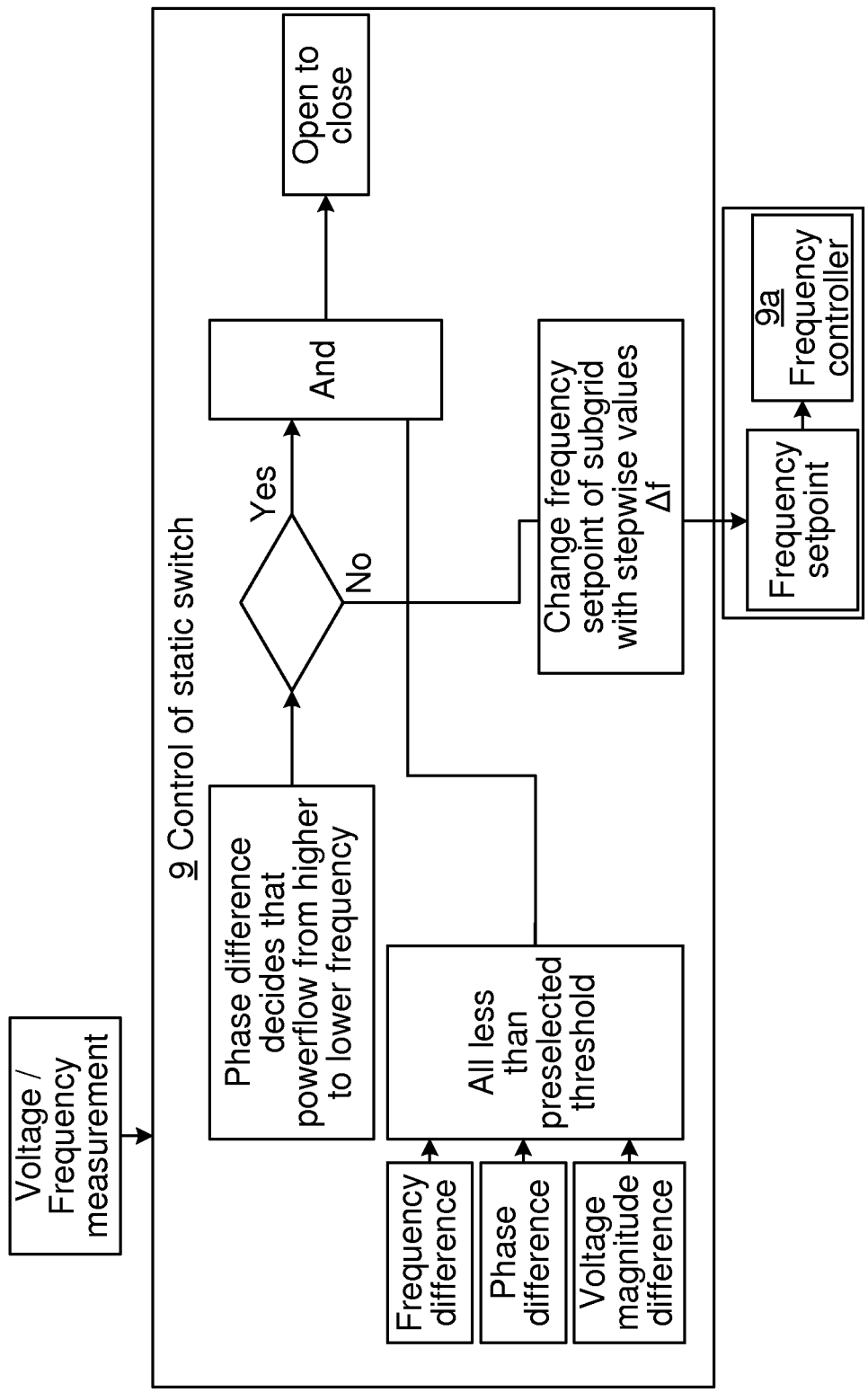
FIG. 6 is a schematic block diagram of an embodiment of a control logic for a switch in a microgrid, in accordance with the present invention.

FIG. 6 schematically illustrates an embodiment of control logic of the controller 9 for the frequency set point. The frequency set point for the first NW 1 is adjusted until voltage and frequency measurements of the first NW 1 indicate that the differences to the second NW 2 in frequencies, voltages and phase (cf. FIG. 1) are below their respective thresholds and that the phases are such that instant power flow in the desired direction at the time of closing the switch 3 is ensured, whereby the controller 9 instructs the switch 3 to close.

FIG. 7 schematically illustrates an embodiment of a controller 9 of the present invention. The controller 9 comprises processor circuitry 71 e.g. a central processing unit (CPU). The processor circuitry 71 may comprise one or a plurality of processing units in the form of microprocessor(s). However, other suitable devices with computing capabilities could be comprised in the processor circuitry 71, e.g. an application specific integrated circuit (ASIC), a field programmable gate array (FPGA) or a complex programmable logic device (CPLD). The processor circuitry 71 is configured to run one or several computer program(s) or software (SW) 81 (see also FIG. 8) stored in a data storage 82 of one or several storage unit(s) e.g. a memory. The storage unit is regarded as a computer readable means 82 (see FIG. 8) as discussed herein and may e.g. be in the form of a Random Access Memory (RAM), a Flash memory or other solid state memory, or a hard disk, or be a combination thereof. The processor circuitry 71 may also be configured to store data in the storage 72, as needed. The controller 9 also comprises a communication interface 73 over which e.g. control signals are sent to the switches 3 for controlling the same and/or control signals are sent for controlling (e.g. communicating a new set point) the frequency of the first NW 1, as well as measurements are made.

FIG. 8 illustrates a computer program product 80. The computer program product 100 comprises a computer readable medium 82 comprising a computer program 101 in the form of computer-executable components 81. The computer program/computer-executable components 81 may be configured to cause a controller 9, e.g. as discussed herein, to perform an embodiment of the methods of the present invention. The computer program/computer-executable components may be run on the processor circuitry 71 of the controller 9 for causing the it to perform the method. The computer program product 80 may e.g. be comprised in a storage unit or memory 72 comprised in the controller 9 and associated with the processor circuitry 71. Alternatively, the computer program product 80 may be, or be part of, a separate, e.g. mobile, storage means, such as a computer readable disc, e.g. CD or DVD or hard disc/drive, or a solid state storage medium, e.g. a RAM or Flash memory.

FIG. 9 is a flow chart illustrating some embodiments of the method performed in a controller 9 of the present invention. The method is for facilitating connection of a first alternating current (AC) power network 1 to a second AC power network 2. The controller 9, when the first power network 1 is disconnected from (a switch 3 is in the open position) the second power network 2, controlling S1 the AC frequency of the first power network based on the AC frequency of the second power network for ensuring that when the first and second networks are connected power will flow from the power network of the first and second power networks having a higher frequency to the power network of the first and second power networks having a lower frequency. Then, after the controlling S1, the controller 9 connects S2 (e.g. by sending control signals to the switch 3 for closing the same) the first power network 1 to the second power network 2, whereby power, at the instant of connecting, flows from the power network of the first and second power networks having a higher frequency to the power network of the first and second power networks having a lower frequency.

In some embodiments of the present invention, the AC frequency of the first power network 1 is controlled to a higher frequency than the AC frequency of the second power network 2, whereby the power flows from the first power network to the second power network after the step of connecting S2. Conversely, in some other embodiments of the present invention, the AC frequency of the first power network 1 is controlled to a lower frequency than the AC frequency of the second power network 2, whereby the power flows from the second power network to the first power network after the step of connecting S2.

In some embodiments of the present invention, the AC frequency is controlled such that the power, directly after the connecting S2, flows in the same direction as it would during steady state conditions of the first and second power networks 1 and 2 when connected to each other.

In some embodiments of the present invention, the step of controlling S1 also comprises controlling the AC frequency of the second power network 2 based on the AC frequency of the first power network 1. Thus, the respective frequencies of both the first and second NW 1 and 2 are controlled prior to being connected to each other.

In some embodiments of the present invention, the first and second power networks 1 and 2 are different segments of the same microgrid 4. In some embodiments, one of the first and second power networks 1 or 2 comprises a distributed generator (DG) 6 and the other of the first and second power networks 1 or 2 comprises a local load 7 of the DG 6. Alternatively, in some other embodiments of the present invention, the first power network 1 is, or is a segments of, the microgrid 4, while the second power network 2 is external to the microgrid 4 e.g. a main power grid 5.

In some embodiments of the present invention, the step of connecting S2 comprises connecting the first and second power networks 1 and 2 by means of a static switch 3, e.g. a grid connecting switch 3a, an area connecting switch 3b or a DG connecting switch 3c, as discussed herein.

In some embodiments of the present invention, the step of controlling S1 also comprises voltage and/or phase angle matching of the first and second power networks 1 and 2. The controlling S1 may e.g. comprise conventional voltage and phase angle matching in either side of the switch 3 before closing the switch 3 to connect the first and second NW 1 and 2, e.g. by observing the rotation of the voltage vector to choose a suitable time for closing the switch 3.

EXAMPLE

Simulations were run to confirm the benefits of the present invention. A first simulation was based on ideal sources to show the impact of proposed inventive control method in the inter tie power flow during resynchronization of the first and second networks 1 and 2. Then, in a second simulation test system, an actual microgrid 4 with converter interfaced DGs 6 was demonstrated.

Simulation with Ideal Sources:

The test system is a simple two ideal source networks 1 and 2 with controllable phase angle, voltage and frequency. The aim is to verify the tie line power oscillations during connection of the two networks 1 and 2 with a breaker 3 and it is shown that the system stability is improved with frequency based control in accordance with the present invention.

Simulation with Converter Interfaced Microgrid:

The test system with two converter interfaced DGs 6 is simulated with and without the inventive frequency based control. The voltage, phase, power and other parameters in the system are kept constant. It was seen that with the proposed control system synchronization there is a better transient response in power and current at tie line as well as the microgrid DGs outputs.

Comparing Simulation Results:

Comparing the method of the present invention with the scheme without proposed frequency control, it was seen that the transient response in tie line power, current and DG output is improved. It is noted that in both cases the other properties (voltage, phase angle, instant of connection, DG power, load, DG converter control etc.) are the same.

Below follow another aspect of the present invention.

According to an aspect of the present invention, there is provided a controller 9 for an electrical microgrid 4, for facilitating connection of a first AC power network 1 to a second AC power network 2. The controller comprises means (e.g. the processor circuitry 71 running suitable SW 81, typically in cooperation with the communication interface 73) for, when the first power network 1 is disconnected from the second power network 2, controlling S1 the AC frequency of the first power network based on the AC frequency of the second power network for ensuring that when the first and second networks are connected power will flow from the power network of the first and second power networks having a higher frequency to the power network of the first and second power networks having a lower frequency. The controller also comprises means (e.g. the processor circuitry 71 running suitable SW 81, typically in cooperation with the communication interface 73) for, after the controlling S1, connecting S2 the first power network 1 to the second power network 2, whereby power, at the instant of connecting, flows from the power network of the first and second power networks having a higher frequency to the power network of the first and second power networks having a lower frequency.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed in an electrical microgrid for facilitating connection of a first alternating current (AC) power network to a second AC power network, the method comprising:
when the first power network is disconnected from the second power network, controlling the AC frequency of the first power network based on the AC frequency of the second power network for ensuring that when the first and second networks are connected power will flow from the power network of the first and second power networks having a higher frequency to the power network of the first and second power networks having a lower frequency; and
after the controlling, connecting the first power network to the second power network, whereby power, at the instant of connecting, flows from the power network of the first and second power networks having a higher frequency to the power network of the first and second power networks having a lower frequency;
wherein the AC frequency is controlled such that the power, directly after the connecting, flows in the same direction as it would during steady state conditions of the first and second power networks when connected to each other.

2. The method of claim 1, wherein the AC frequency of the first power network is controlled to a higher frequency than the AC frequency of the second power network, whereby the power flows from the first power network to the second power network after the step of connecting.

3. The method of claim 2, wherein the method is applied in a cascading manner on different levels of the microgrid.

4. The method of claim 2, wherein the step of controlling also comprises controlling the AC frequency of the second power network based on the AC frequency of the first power network.

5. The method of claim 2, wherein the first and second power networks are different segments of the microgrid.

6. The method of claim 1, wherein the AC frequency of the first power network is controlled to a lower frequency than the AC frequency of the second power network, whereby the power flows from the second power network to the first power network after the step of connecting.

7. The method of claim 1, wherein the method is applied in a cascading manner on different levels of the microgrid.

8. The method of claim 1, wherein the step of controlling also comprises controlling the AC frequency of the second power network based on the AC frequency of the first power network.

9. The method of claim 1, wherein the first and second power networks are different segments of the microgrid.

10. The method of claim 9, wherein one of the first and second power networks comprises a distributed generator, DG, and the other of the first and second power networks comprises a local load of the DG.

11. The method of claim 1, wherein the first power network is, or is a segments of, the microgrid, and the second power network is external to the microgrid e.g. a main power grid.

12. The method of claim 1, wherein the step of connecting comprises connecting the first and second power networks by means of a static switch.

13. The method of claim 1, wherein the step of controlling also comprises voltage and/or phase angle matching of the first and second power networks.

14. A controller for an electrical microgrid, for facilitating connection of a first alternating current (AC) power network to a second AC power network, the controller comprising:
a processor circuitry; and
a storage unit storing instructions executable by said processor circuitry whereby said controller is operative to:
when the first power network is disconnected from the second power network, control the AC frequency of the first power network based on the AC frequency of the second power network for ensuring that power will flow from the power network of the first and second power networks having a higher frequency to the power network of the first and second power networks having a lower frequency; and
after the controlling, connect the first power network to the second power network, whereby power, at the instant of connecting, flows from the power network of the first and second power networks having a higher frequency to the power network of the first and second power wherein the AC frequency is controlled such that the power, directly after the connecting, flows in the same direction as it would during steady state conditions of the first and second power networks when connected to each other.

15. A microgrid comprising a controller including:
a processor circuitry; and
a storage unit storing instructions executable by said processor circuitry whereby said controller is operative to:
when the first power network is disconnected from the second power network, control the AC frequency of the first power network based on the AC frequency of the second power network for ensuring that power will flow from the power network of the first and second power networks having a higher frequency to the power network of the first and second power networks having a lower frequency; and
after the controlling, connect the first power network to the second power network, whereby power, at the instant of connecting, flows from the power network of the first and second power networks having a higher frequency to the power network of the first and second power wherein the AC frequency is controlled such that the power, directly after the connecting, flows in the same direction as it would during steady state conditions of the first and second power networks when connected to each other.

16. A computer program product comprising computer-executable components for causing a microgrid controller to perform the method including the steps of:
when the first power network is disconnected from the second power network, controlling the AC frequency of the first power network based on the AC frequency of the second power network for ensuring that when the first and second networks are connected power will flow from the power network of the first and second power networks having a higher frequency to the power network of the first and second power networks having a lower frequency;
after the controlling, connecting the first power network to the second power network, whereby power, at the instant of connecting, flows from the power network of the first and second power networks having a higher frequency to the power network of the first and second power networks having a lower frequency;

wherein the AC frequency is controlled such that the power, directly after the connecting, flows in the same direction as it would during steady state conditions of the first and second power networks when connected to each other; and when the computer-executable components are run on processor circuitry comprised in the controller.

17. A computer program comprising computer program code which is able to, when run on processor circuitry of a microgrid controller, cause the controller to:

when a first power network is disconnected from a second power network, control the AC frequency of the first power network based on the AC frequency of the second power network for ensuring that power will flow from the power network of the first and second power networks having a higher frequency to the power network of the first and second power networks having a lower frequency; and after the controlling, connect the first power network to the second power network, whereby power, at the instant of connecting, flows from the power network of the first and second power networks having a higher frequency to the power network of the first and second power networks having a lower frequency;

wherein the AC frequency is controlled such that the power, directly after the connecting, flows in the same direction as it would during steady state conditions of the first and second power networks when connected to each other.

18. A computer program product comprising the computer program of claim 17 and a computer readable means on which the computer program is stored.

\* \* \* \* \*